UNITED STATES PATENT OFFICE.

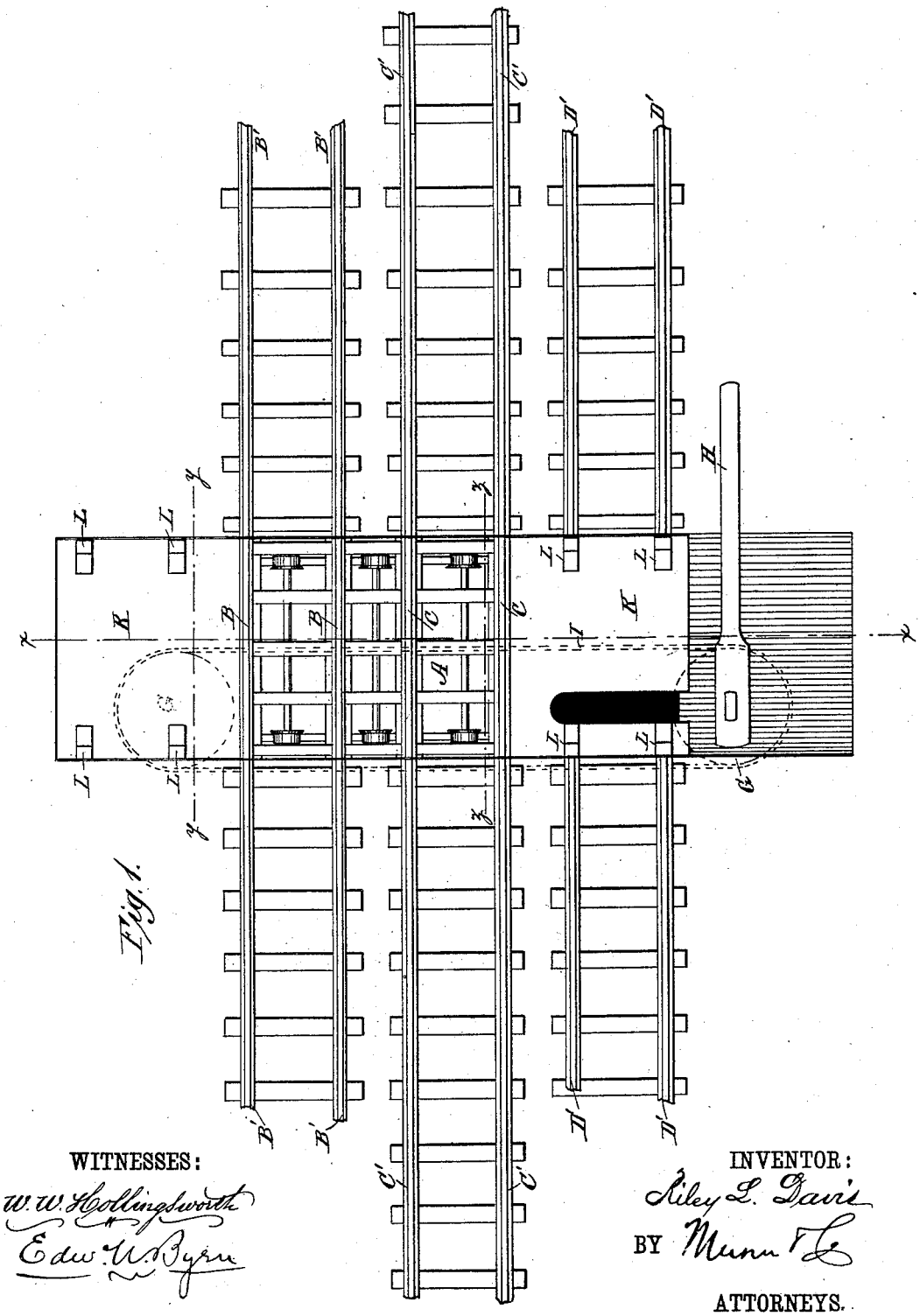

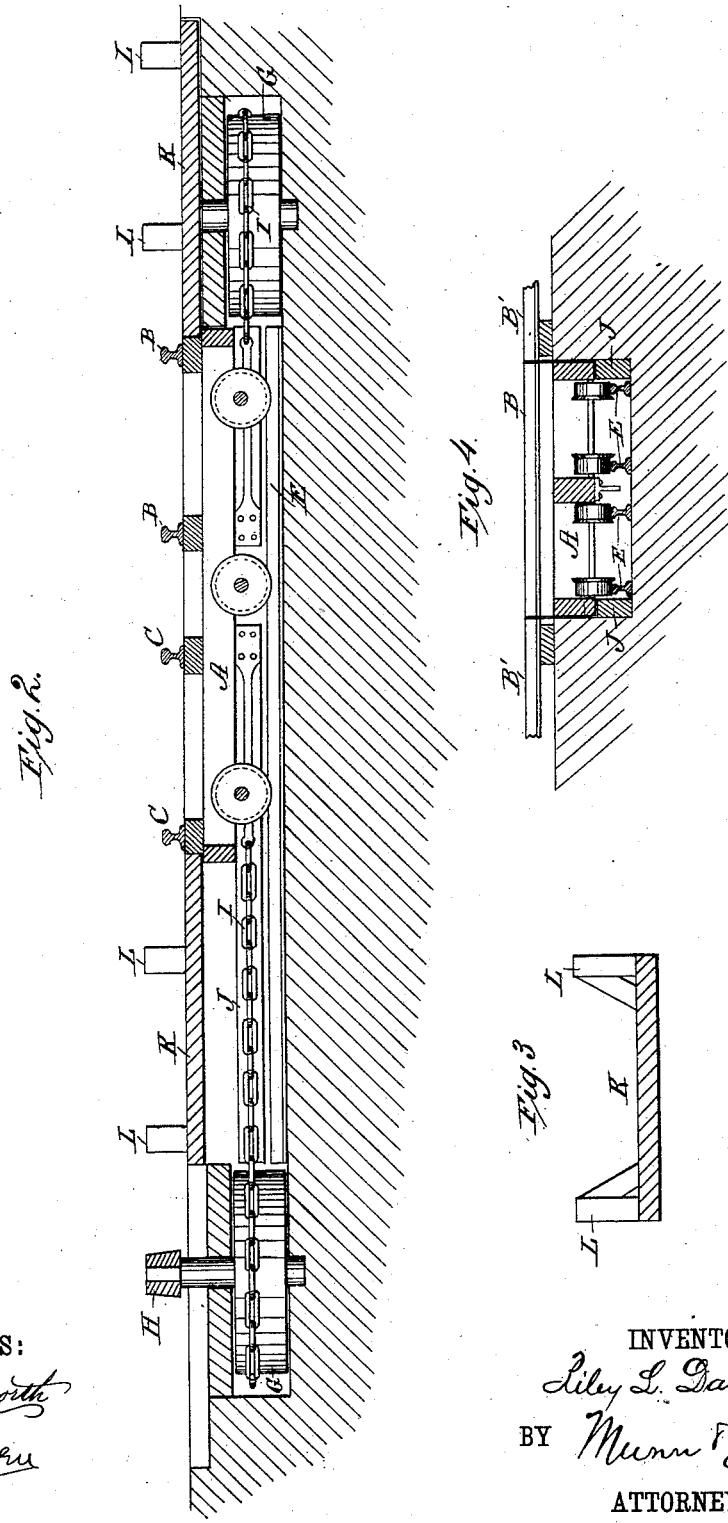

RILEY L. DAVIS, OF MOORESVILLE, NORTH CAROLINA, ASSIGNOR OF ONE-HALF TO JOHN F. McLEAN, OF SAME PLACE.

CAR-TRANSFER APPARATUS.

SPECIFICATION forming part of Letters Patent No. 318,360, dated May 19, 1885.

Application filed April 26, 1884. (No model.)

*To all whom it may concern:*

Be it known that I, RILEY L. DAVIS, a citizen of the United States, residing at Mooresville, in the county of Iredell and State of North Carolina, have invented certain new and useful Improvements in Car-Transfer Apparatus, of which the following is a description.

Figure 1 is a plan view. Fig. 2 is a vertical section through the line $x\,x$ of Fig. 1. Fig. 3 is a cross-section of the platform-wing through line $y\,y$ of Fig. 1, and Fig. 4 is a vertical section through the line $z\,z$ of Fig. 1.

My invention relates to that form of car-transfer apparatus in which a truck or platform bearing rails on top (adapted to register with the main track and sidings) is mounted upon wheels and made to be laterally adjustable to the permanent-track rails, so as to take a car off of one set of track-rails and be then shifted laterally to bring it into registration with the rails of another track or siding to transfer the car thereto.

My invention consists in the peculiar construction of the truck or platform having two sections of rails, whereby the main track is never left open, in combination with the peculiar means for shifting the truck or platform, and also in the combination, with the recessed road-bed and shifting-truck, of covers for preventing the recessed road-bed or truck-pit from ever being uncovered or exposed in shifting the truck from side to side.

In the drawings, A represents a truck or platform mounted upon wheels and carrying two sets of track-rails, B B and C C, adapted to register with the tracks B′ B′, C′ C′, or D′ D′ of the road-bed, of which the middle track, C′ C′, is the main track, and B′ B′ and D′ D′ side tracks. A pit or recess is formed across the road-bed, in which plays the truck or wheeled platform A, so that its rail-sections are on a level with the rails of the road-bed. In the bottom of this recess or pit are arranged rails E, transversely to the rails of the main track, and upon which the wheels of the truck A run. The recess or pit in which this truck moves is one-third longer than the truck, so that the truck moves one-third of its length in the same in shifting from side to side and bringing its rails into registration with the several tracks.

For shifting the truck a large horizontal pulley, G, is located on each side of the truck-pit in a suitable casing below the level of the ground, and one of them has an axis that protrudes above the road-bed, and is rigidly attached to a heavy horizontal arm, H. Around these pulleys there passes a chain, rope, or other flexible connection, I, one side of which chain is attached to the truck A. Now, the pulleys G are made of sufficient size that one half-revolution gives the necessary movement of the truck in shifting its rails from one track to the next, so that to do this all that is necessary is to turn the lever-arm H half-way around its axis, which may be easily done by one man.

The object in having the truck of sufficient length to carry two sets of rails spaced to correspond to any two sets of the track-rails is to insure having always one set of rails in registration with the main or middle track, no matter which side of the pit the truck may be on, and thus keeping the track always closed and safe as against accidents.

J J are two beams attached to the sides of the truck-pit, and which lap under the edges of the truck. These beams act to take a part of the strain of the passing trains off the wheels of the truck, and also act as safety-catches for the platform of the truck in case the wheels of the truck are derailed or broken.

In shifting the platform from side to side it will be seen that there is always one-third of the pit beyond the end of the truck, and if this space were left open or uncovered cars on the siding might get loose and run into the same. To prevent this I attach to the truck or platform side wings or frames, K, bearing stop blocks or braces L. These side frames move with the truck or platform, and to permit them to pass upon the road-bed beyond the pit the road-bed is recessed about six inches to accommodate the lap of said frames. With this construction it will be seen that the pit is never left open at either of the sidings.

In defining my invention with greater clearness, I would state that I am aware that laterally-adjustable shifting-trucks have been provided with rails for shifting cars from one track to another, and that an endless chain and pulley are also old in this connection; but

What I claim is—

1. The combination, with the platform or truck A, bearing two sets of rails and arranged in a pit in the road-bed, to be adjusted at right angles to the track-rails, of the endless chain disposed in a horizontal plane and attached to the truck, the large horizontal pulleys arranged upon opposite sides of the track and distending the chain, and the lever-arm H, attached rigidly to one of said pulleys, as and for the purpose described.

2. The combination, with a railroad-track having a transverse recess or pit, of the laterally-adjustable truck A, having side wings or frames, K, to keep the pit always covered, as and for the purpose described.

3. The combination, with a railroad-track having a transverse recess or pit, of the laterally-adjustable truck A, having side wings or frames, K, with stop blocks or braces L, as and for the purpose described.

RILEY L. DAVIS.

Witnesses:
   E. T. GOODMAN,
   THOS. GRIFFITH.